United States Patent Office 2,930,805
Patented Mar. 29, 1960

2,930,805
NOVEL DERIVATIVES OF ESTRANE

David J. Marshall, Westmount, Quebec, Canada, assignor to American Home Products Corporation, New York, N.Y., a corporation of Delaware No Drawing. Application January 19, 1959
Serial No. 787,367

18 Claims. (Cl. 260—397.4)

This invention relates to novel derivatives of estrane, particularly to 3,17β-dihydroxy-5(10),7-estradienes and to methods of preparing them from equilin methyl ether. More particularly it relates to compounds having the structural formula

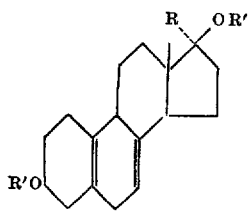

in which R represents methyl or hydrogen in the α-configuration and R' represents hydrogen or an acyl radical of an organic carboxylic acid, and to intermediates and methods useful in the preparation of these estradienes. The methods of this invention for the preparation of compounds of the above formula apparently lead to the formation of both 3α- and 3β- derivatives, so the products are unresolved mixtures of the 3α- and 3β- isomers.

As starting material for the herein-described novel syntheses I employ the steroid hormone equilin, which may be recovered from the urine of pregnant mares. I first convert the equilin (I) to its methyl ether (II) by the action of dimethyl sulfate and aqueous alkali. As a second step of my synthesis, I introduce an hydroxyl group in the β- configuration at position 17; this may be done by reduction with lithium aluminum hydride to yield 17β-dihydroequilin 3-methyl ether (IIIa) or by reaction with methyl magnesium halide to yield 17α-methyl-dihydroequilin 3-methyl ether (IIIb). As a third step, IIIa or IIIb is reduced with an alkali metal, preferably lithium, and alcohol in liquid ammonia to form 3-methoxy-17β-hydroxy-2,5(10),7-estratriene (IVa) or 3-methoxy-17α-methyl-17β-hydroxy-2,5(10),7-estratriene (IVb). As a fourth step, I cleave IVa or IVb with a mild acid such as acetic or oxalic acid to produce 17β-hydroxy-5(10),7-estradiene-3-one (Va) or 17α-methyl-17β-hydroxy-5(10),7-estradiene-3-one (Vb), respectively. As a fifth step, the 3-keto group of Va or Vb is reduced with lithium aluminum hydride or sodium borohydride to yield 3,17β-dihydroxy-5(10),7-estradiene (VIa) or 3,17β-dihydroxy-17α-methyl-5(10),7-estradiene (VIb). As an optional sixth step, I may esterify VIa or VIb and thereby produce mono- or diesters of these diols. Suitable esters are the acetates, propionates, acid succinates, 4,4-dimethylvalerates, oenanthates, benzoates, and phenylacetates. Especially desirable are the diesters derived from propionic and benzoic acids.

The above reactions are illustrated graphically below:

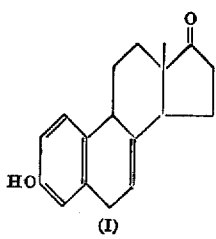
(I)

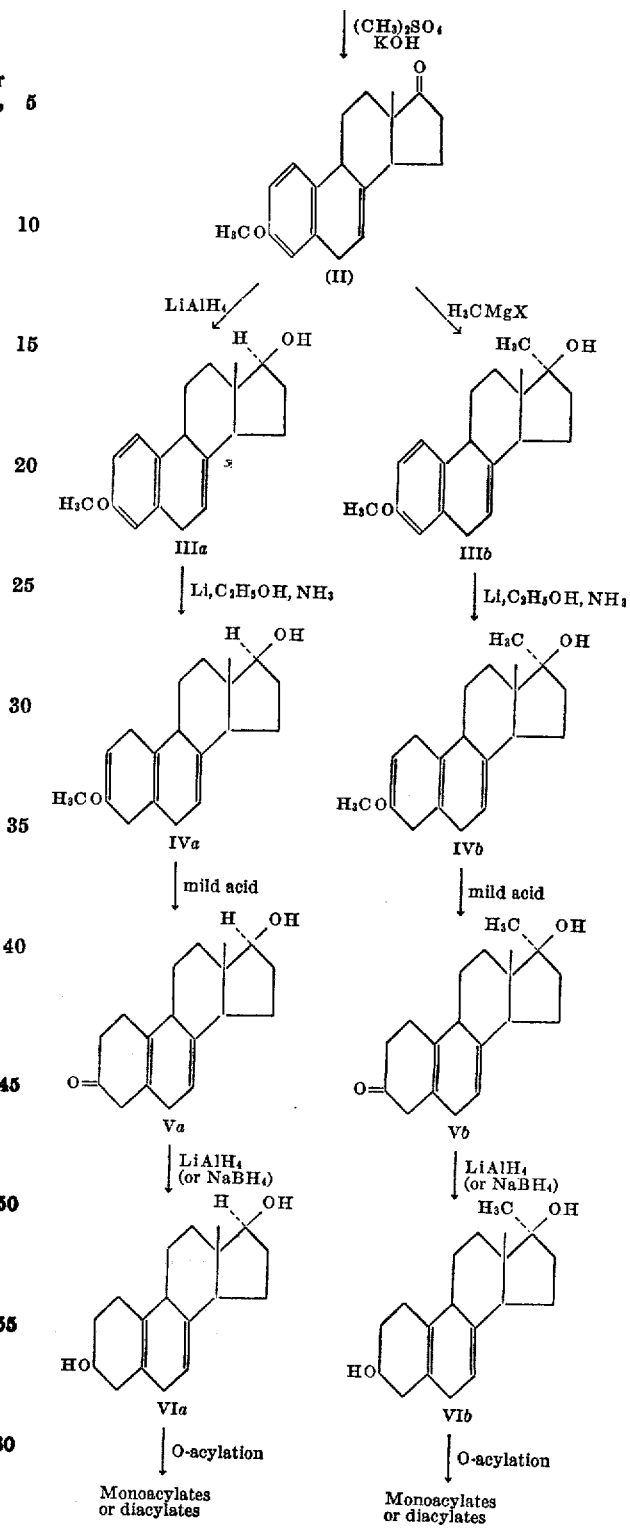

The dihydroxyestradienes (VIa and VIb) and their esters have been found to have antiestrogenic activity.

The esters are pharmacologically equivalent to the diols VIa and VIb, are considerably less hygroscopic, and have greater storage stability against darkening under the influence of air and light. They are accordingly preferred when such greater stability is desirable.

The following examples give details of the preparation of the new compounds, but these are intended to be illustrative only and not to limit my invention, the scope of which is defined in the appended claims.

*Example 1.—Equilin methyl ether (II)*

To 25 g. of equilin (I) in 500 ml. of ethanol under reflux was added alternately, in 40-ml. portions, 200 ml. of 50 percent aqueous potassium hydroxide solution and 200 ml. of dimethyl sulfate, over a period of 1.5 hours. After stirring an additional 30 minutes, 400 ml. of water was added. The mixture was cooled and the precipitated product was washed well with water, dried, and crystallized from methylene chloride-methanol. The equilin methyl ether melted at 161–163° C.; $[\alpha]_D^{24°}$ C.$+290°$ (c.=1% in chloroform).

*Analysis:* Calculated for $C_{19}H_{22}O_2$: C, 80.81%; H, 7.86%. Found: C, 81.16%; H, 7.67%.

*Example 2.—17β-dihydroequilin 3-methyl ether (IIIa)*

To 3.1 g. of lithium aluminum hydride in 400 ml. of ether was added a solution of 12.9 g. of equilin methyl ether (II) in 250 ml. of benzene, and the mixture was heated under reflux with stirring for 2 hours. After decomposing excess hydride with ethyl acetate, just sufficient water was added to precipitate the inorganic salts, and the mixture was filtered. The filtrate was evaporated under vacuum leaving a residue of 13 g. comprising 17β-dihydroequilin 3-methyl ether (IIIa).

*Example 3.—17β-hydroxy-3-methoxy-2,5(10),7-estratriene (IVa)*

The product of Example 2 was dissolved in 720 ml. of ether, and to this solution was added about 1200 ml. of liquid ammonia, followed by 13.9 g. of lithium cut into small pieces. One hundred and thirty ml. of absolute ethanol was then added dropwise with stirring over a period of 1 hour. The ammonia was allowed to evaporate, water was added, and the other layer was separated. The aqueous phase was extracted once with ether, and the combined ether solutions were washed with a solution of 35 g. potassium hydroxide in 25 ml. water and 100 ml. methanol, and with water, and dried over magnesium sulfate. The residue left after evaporation of the solvent under vacuum was recrystallized from a mixture of absolute ethanol and hexane and then from absolute ethanol. The 17β-hydroxy-3-methoxy-2,5(10),7-estratriene melted at 176–182° C. in an evacuated capillary and had an optical rotation $[\alpha]_D^{23°}$ C.$+195.0°$ (c=1% in chloroform). Its infrared spectrum showed absorption bands at 1685, 1668, and 1222 cm.$^{-1}$.

*Analysis.*—Calculated for $C_{19}H_{26}O_2$; C, 79.68%; H, 9.15%. Found C, 79.64%; H, 9.50%.

*Example 4.—17β-hydroxy-5(10),7-estradiene-3-one (Va)*

A suspension of 6.0 g. of 17β-hydroxy-3-methoxy-2,5(10),7-estratriene (IVa) in 121 ml. of methanol was heated to reflux and 12 ml. of glacial acetic acid was added. After heating under reflux for 15 minutes, 210 ml. of water was added. The solid obtained on cooling was recrystallized from aqueous methanol. In an evacuated capillary the resulting 17β-hydroxy-5(10),7-estradiene-3-one melted at 145–147° C., and had an optical rotation $[\alpha]_D^{23°}$ C.$+251.1°$ (c.=1% in dioxane). Its infrared spectrum showed an absorption band at 1721 cm.$^{-1}$.

*Analysis.*—Calculated for $C_{18}H_{24}O_2$; C, 79.36%; H, 8.80%. Found: C, 79.68%; H, 8.65%.

*Example 5.—3,17β-dihydroxy-5(10),7-estradiene (VIa)*

To a refluxing suspension of 1.8 g. of lithium aluminum hydride in 140 ml. of ether was added a solution of 3.7 g. of 17β-hydroxy-5(10),7-estradiene-3-one (Va) in 35 ml. of benzene and the mixture was stirred and heated under reflux for 2.5 hours. After decomposing excess hydride with ethyl acetate, just sufficient water was added to precipitate the inorganic salts and the mixture was filtered. The residue left after evaporation of the solvent from the filtrate was crystallized from methanol, yielding 3,17β-dihydroxy-5(10),7-estradiene melting at 160–167° C., and having an optical rotation $[\alpha]_D^{24°}$ C.$+171.5°$ (c.=1% in dioxane).

*Analysis.*—Calculated for $C_{18}H_{26}O_2$: C, 78.77%; H, 9.55%. Found: C, 78.74%; H, 9.43%.

*Example 6.—17α-methyldihydroequilin 3-methyl ether (IIIb)*

To a solution of methylmagnesium iodide made from 76 g. of methyl iodide and 13 g. of magnesium in 100 ml. of ether was added a solution of 15.0 g. of equilin methyl ether (II) in 180 ml. of benzene. The mixture was stirred and refluxed under nitrogen for 7.5 hours and then stirred overnight at room temperature. Saturated aqueous ammonium chloride solution was added to precipitate the inorganic salts and the organic phase was separated and evaporated in vacuo. The residue was dissolved in 170 ml. of methanol, 20.0 g. of Girard's "T" reagent (hydrazide of (carboxymethyl) trimethylammonium chloride) and 10 ml. of acetic acid were added, and the solution was heated under reflux for one hour. The cooled solution was poured into 1.5 l. of ice-water containing 6.2 g. of sodium hydroxide and the product was extracted with ether. Crystallization from an ether-hexane mixture yielded 17α-methylhidhydoequilin 3-methyl ether, M.P. 133.5–135.5° C., $[\alpha]_D^{24°C}+170.8°$ (c.=1% in chloroform).

*Analysis.*—Calculated for $C_{20}H_{28}O_2$: C, 80.50%; H, 8.78%. Found: C, 80.42%; H, 8.66%.

*Example 7.—17α-methyl-17β-hydroxy-3-methoxy-2,5(10),7-estratriene (IIIb)*

To a solution of 19.7 g. of 17α-methyldihydroequilin 3-methyl ether (IIIb) in 600 ml. of tetrahydrofuran was added about 1200 ml. of liquid ammonia followed by 19.7 g. of lithium cut into small pieces. The mixture was stirred under a Dry-Ice-cooled condenser for one hour and then a mixture of 190 ml. of absolute ethanol and 190 ml. of ether was added over a period of 70 minutes. After most of the ammonia had evaporated, water was added, and most of the tetrahydrofuran was removed in vacuo. The product was extracted into ether and the ether solution was washed with 0.5 N potassium hydroxide solution and with water, and dried over magnesium sulfate. Evaporation of the ether left a residue which was crystallized from methanol, yielding 17α-methyl-17β-hydroxy-3-methoxy-2,5(10),7-estratriene, M.P. 183–184° C. in an evacuated capillary; $[\alpha]_D^{24°}$ C.$+167.1°$ (c=1% in chloroform).

*Analysis.*—Calculated for $C_{20}H_{28}O_2$: C, 79.98%; H, 9.39%. Found: C, 79.89%; H, 9.19%.

*Example 8.—17α-methyl-17β-hydroxy-5(10),7-estradiene-3-one (Vb)*

A suspension of 2.0 g. of 17α-methyl-17β-hydroxy-3-methoxy-2,5(10),7-estratriene (IVb) in 35 ml. of methanol was heated to reflux and 3.5 ml. of acetic acid was added. The mixture was kept under reflux for 15 minutes and the crude product obtained by the addition of water and cooling was crystallized from methanol and then from a mixture of acetone and petroleum ether. The resulting 17α-methyl-17β-hydroxy-5(10),7-estradiene-3-one melted at 160–162° C. in an evacuated capillary and had an optical rotation of $[\alpha]_D^{24°}$ C.$+219.0°$ (c.=1% in dioxane). Its infrared spectrum showed an absorption band at 1723 cm$^{-1}$.

*Analysis.*—Calculated for $C_{19}H_{26}O_2$: C, 79.68%; H 9.15%. Found: C, 79.82%; H, 9.17%.

*Example 9.—17α-methyl-3,17β-dihydroxy-5(10),7-estradiene (VIb)*

To a solution of 5.85 g. of 17α-methyl-17β-hydroxy 5(10),7-estradiene-3-one (Vb) in 58 ml. of methano was added a solution of 5.85 g. of sodium borohydride ii 30 ml. of methanol. After standing 3 hours at roon temperature, the mixture was filtered and acidified to pH 6 with 20 percent aqueous acetic acid. Addition of water precipitated the crude product which was crystallized from aqueous methanol and then from a mixture of benzene and hexane. The resulting 17α-methyl-3,17β-dihydroxy-5(10),7-estradiene melted at 152–162° C. in an evacuated capillary and had an optical rotation of $[\alpha]_D^{23°\ C.}+168.9°$ (c.=1% in dioxane).

*Analysis.*—Calculated for $C_{19}H_{28}O_2$: C, 79.12%; H, 9.79%. Found: C, 79.41%; H, 9.72%.

Example 10.—3,17β-dihydroxy-5(10),7-estradiene diacetate

One gram of 3,17β-dihydroxy-5(10),7-estradiene (VIa) was dissolved in a mixture of 5 ml. of pyridine and 10 ml. of acetic anhydride, and the solution was left overnight at room temperature. The resulting crude diacetate was purified by dissolving in 1:1 benzene-petroleum ether and passing the solution through a column of 30 g. of alumina. Evaporation of the solvent then left 3,17β-dihydroxy-5(10),7-estradiene diacetate as a colorless viscous oil, $[\alpha]_D^{24°\ C.}+127.4°$ (c.=1% in chloroform).

*Analysis.*—Calculated for $C_{22}H_{30}O_4$: C, 73.72%; H, 8.44%. Found: C, 73.81%; H, 8.54%.

Example 11.—3,17β-dihydroxy-5(10),7-estradiene dibenzoate

To a solution of 1.00 g. of 3,17β-dihydroxy-5(10),7-estradiene (VIa) in 10 ml. of pyridine, cooled in an ice bath, was added 2.0 ml. of benzoyl chloride. After standing overnight at room temperature, the mixture was poured onto ice and the product was extracted with a mixture of ether and ethyl acetate. After washing with dilute hydrochloric acid, sodium bicarbonate solution, and water, the solution was dried over magnesium sulfate and the solvent was removed in vacuo. The resulting crude dibenzoate was chromatographed on 60 g. of alumina in benzene-petroleum ether 1:4. The solid obtained from the first 100 ml. of eluate was crystallized from acetone-methanol, yielding 3,17β-dihydroxy-5(10),7-estradiene dibenzoate, M.P. 174.5–177.5° C.; $[\alpha]_D^{24°\ C.}+152.3°$ (c.=1% in chloroform).

*Analysis.*—Calculated for $C_{32}H_{34}O_4$: C, 79.66%; H, 7.10%. Found: C, 79.82%; H, 7.03%.

Example 12.—3,17β-dihydroxy-5(10),7-estradiene dioenanthate 3,17β-dihydroxy-5(10),7-estradiene (0.3 g.) in pyridine (3 ml.) was treated with n-heptanoic anhydride (1.5 ml.) overnight at room temperature. The solution was diluted with water and the resulting oil extracted with ether. The extract was washed with 3 N hydrochloric acid, 1 N sodium hydroxide and water. Evaporation of the dried solution gave a pale yellow gum which was dissolved in light petroleum (B.P. 40–60° C., 40 ml.), and percolated through a short column of alumina (5 g.). Elution with benzene-ether (1:1) gave a clear gum which was treated with charcoal (solution in light petroleum) to give the product as a clear gum, $[\alpha]_D^{24°\ C.}+68.8°$ (c.=0.96% in dioxane).

*Analysis.*—Calculated for $C_{32}H_{50}O_4$: C, 77.06%; H, 10.11%. Found: C, 77.32%; H, 9.98%.

Example 13.—3,17β-dihydroxy-5(10),7-estradiene di-(4,4-dimethylvalerate)

3,17β-dihydroxy-5(10),7-estradiene (0.5 g) was dissolved in pyridine (1 ml.) and benzene (3 ml.), and 4,4-dimethylvaleroyl chloride (0.5 ml.) in benzene (1 ml.) was added dropwise with shaking. The reaction mixture was left at room temperature for 44 hours, diluted with benzene, washed with 1 N sodium hydroxide, 3 N hydrochloric acid, water, and dried over sodium sulfate. Evaporation gave a clear gum which was dissolved in light petroleum (B.P. 40–60° C.)-benzene (1:1, 100 ml.) and percolated through a column of alumina (10 g.). Elution with the same solvent mixture gave the product as a clear gum $[\alpha]_D^{24°\ C.}+103.8°$ (c.=1.2% in dioxane).

*Analysis.*—Calculated for $C_{32}H_{50}O_4$: C, 77.06%; H, 10.11%. Found: C, 76.96%; H, 9.85%.

Example 14.—3,17β-dihydroxy-5(10),7-estradiene diphenylacetate

To an ice-cold solution of 3,17β-dihydroxy-5(10),7-estradiene (0.5 g) in pyridine (1 ml.) and benzene (3 ml) was added phenylacetyl chloride (0.5 ml) in benzene (1 ml.) and the reaction was left overnight at room temperature. The solution was diluted with benzene and washed with 1 N sodium hydroxide, 3 N hydrochloric acid and water. The yellow gum obtained on evaporation of the dried solution was dissolved in benzene (100 ml.) and percolated through a column of alumina (2.5 g.). Elution with the same solvent gave the product as a clear gum, $[\alpha]_D^{24°\ C.}+53.1°$ (c.=1.02% in chloroform).

*Analysis.*—Calculated for $C_{24}H_{38}O_4$: C, 80.00%; H, 7.45%. Found: C, 80.26%; H, 7.64%.

Example 15.—3,17β-dihydroxy-5(10),7-estradiene dihemisuccinate 3,17β-dihydroxy-5(10),7-estradiene (0.5 g.) in pyridine (25 ml.) was heated with succinic anhydride (0.5 g.) on the steam bath for 3 hours. A few drops of water were added and approximately 50% of the solvent removed by distillation under vacuum. The dark colored concentrate was diluted with water and extracted with ether. The ether extract was then extracted twice with 10% sodium carbonate solution, and the alkali extracts combined and acidified with 1 N hydrochloric acid. The gum which separated was extracted with ether and the extract was washed with water and dried ($Na_2SO_4$). The brown gum obtained on evaporation was dissolved in methanol and treated with charcoal. The product was obtained on evaporation as a hard clear gum, $[\alpha]_D^{24°\ C.}+66°$ (c.=1.03% in chloroform).

*Analysis.*—Calculated for $C_{26}H_{34}O_8$: C, 65.83%; H, 7.17%. Found: C, 66.12%; H, 6.97%.

Example 16.—3,17β-dihydroxy-5(10),7-estradiene dipropionate

A solution of 3,17β-dihydroxy-5(10),7-estradiene (5 g.) in pyridine (50 ml.) was treated overnight with propionic anhydride (25 ml.). The solution was diluted with water, extracted with ether and washed with 3 N hydrochloric acid, 10% sodium carbonate and water. Evaporation of the dried solution ($Na_2SO_4$) gave a cloudy gum, which was dissolved in light petroleum (200 ml.) and percolated through a column of alumina (100 g.). Elution with light petroleum-benzene (1:1) gave a clear gum (3 g.) which solidified on standing. Two crystallizations from methanol-water gave the product as colorless blades, M.P. 65–68° C. $[\alpha]_D^{24°\ C.}+100°$ (c.=1.1% in chloroform).

*Analysis.*—Calculated for $C_{24}H_{34}O_4$: C, 74.61%; H, 8.80%. Found: C, 74.40%; H, 8.23%.

Example 17.—3,17β-dihydroxy-17α-methyl-5(10),7-estradiene 3-acetate

A solution of 0.15 g. of 3,17β-dihydroxy-17α-methyl-5(10),7-estradiene in 2 ml. of pyridine and 2 ml. of acetic anhydride was left overnight at room temperature. The crude product obtained on evaporation in vacuo was dissolved in benzene and filtered through a column of 3 g. of alumina. 3,17β-dihydroxy-17α-methyl-5(10),7-estradiene 3-acetate was obtained as a colorless glass showing hydroxyl absorption in the infrared at 3660 cm.$^{-1}$ and ester carbonyl absorption at 1738 cm.$^{-1}$.

This application is a continuation-in-part of my two earlier applications, Serial No. 715,837, filed February 17, 1958, and Serial No. 760,079, filed September 10, 1958, both of which are now abandoned.

I claim:
1. Estrane derivatives having the formula

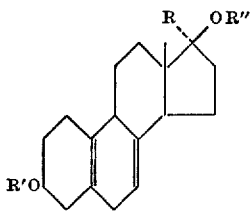

in which R represents a member of the class consisting of hydrogen and methyl and in which R' and R" each represents a member of the class consisting of hydrogen and the acyl radicals of hydrocarbon carboxylic acids, and in which at least one member of the group R and R" is hydrogen.
2. Diols according to claim 1
3. Diesters according to claim 1.
4. 3-monoesters according to claim 1.
5. 3,17β-dihydroxy-5(10),7-estradiene.
6. 3,17β-dihydroxy-17α-methyl-5(10),7-estradiene.
7. 3,17β-dibenzoyloxy-5(10),7-estradiene.
8. 3,17β-dipropionoxy-5(10),7-estradiene.
9. 3,17β-diacetoxy-5(10),7-estradiene.
10. 3,17β-dihydroxy-5(10),7-estradiene dioenanthate.
11. 3,17β-dihydroxy-5(10),7-estradiene di-(4,4-dimethylvalerate).
12. 3,17β-diphenylacetoxy-5(10),7-estradiene.
13. 3,17β-dihydroxy-5(10),7-estradiene di - hemisuccinate.
14. 3-acetoxy-17β-hydroxy-17α - methyl - 5(10),7 - estradiene.
15. 17β-hydroxy-3-methoxy-2,5(10),7-estratriene.
16. 17β-hydroxy-17α-methyl-3-methoxy-2,5(10),7 - estratriene.
17. 17β-hydroxy-5(10),7-estradiene-3-one.
18. 17β-hydroxy-17α-methyl-5(10),7-estradiene-3-one.

References Cited in the file of this patent
UNITED STATES PATENTS

| | | |
|---|---|---|
| 2,781,365 | Djerassi et al. | Feb. 12, 1957 |
| 2,846,451 | Sondheimer et al. | Aug. 5, 1958 |
| 2,846,452 | Campbell et al. | Aug. 5, 1958 |